United States Patent
Stogdill et al.

(10) Patent No.: US 12,098,784 B2
(45) Date of Patent: Sep. 24, 2024

(54) PIPING COMPONENT HAVING A PLURALITY OF GROOVES

(71) Applicant: NIBCO INC., Elkhart, IN (US)

(72) Inventors: James Stogdill, Elkhart, IN (US); Andrew Stevens, Osceola, IN (US)

(73) Assignee: NIBCO INC., Elkhart, IN (US)

( * ) Notice: Subject to any disclaimer, the term of this patent is extended or adjusted under 35 U.S.C. 154(b) by 164 days.

(21) Appl. No.: 16/815,638

(22) Filed: Mar. 11, 2020

(65) Prior Publication Data

US 2020/0309289 A1    Oct. 1, 2020

Related U.S. Application Data

(60) Provisional application No. 62/823,772, filed on Mar. 26, 2019.

(51) Int. Cl.
*F16L 13/14* (2006.01)

(52) U.S. Cl.
CPC ............. *F16L 13/147* (2013.01); *F16L 13/14* (2013.01); *F16L 13/142* (2013.01)

(58) Field of Classification Search
CPC ....... F16L 13/147; F16L 13/14; F16L 13/142; F16L 17/02; F16L 21/02; F16L 21/03; F16L 13/141
USPC ......... 285/95, 382, 344, 345, 339, 374, 379, 285/382.4, 382.5, 399, 231
See application file for complete search history.

(56) References Cited

U.S. PATENT DOCUMENTS

| | | | |
|---|---|---|---|
| 1,725,286 A * | 8/1929 | Loughead | |
| 3,572,779 A | 3/1971 | Dawson | |
| 3,579,794 A | 5/1971 | Powell | |
| 3,675,949 A | 7/1972 | Dawson | |
| 4,076,287 A * | 2/1978 | Bill | F16L 13/147 |
| 4,328,982 A * | 5/1982 | Christianson | F16L 13/142 |
| 4,985,975 A * | 1/1991 | Austin | F16L 13/147 |
| 5,080,406 A | 1/1992 | Hyatt et al. | |
| 6,405,762 B1 * | 6/2002 | Bunch | F16L 13/147 |
| 6,619,701 B1 * | 9/2003 | Udhofer | F16L 13/141 |
| | | | 285/382 |
| 6,692,040 B1 | 2/2004 | McKay et al. | |
| 7,954,861 B2 * | 6/2011 | Swift | F16L 13/142 |
| | | | 285/382 |

(Continued)

FOREIGN PATENT DOCUMENTS

WO    WO-2019115565 A1 *    6/2019

OTHER PUBLICATIONS

RLS LLC, ZoomLock Flame-Free Refrigerant Fittings, May 2018, pp. 1-31 (Year: 2018).*
WO-2019115565-A1—Machine Translation—English (Year: 2019).*

*Primary Examiner* — William S. Choi
(74) *Attorney, Agent, or Firm* — Price Heneveld LLP

(57) ABSTRACT

A piping component for a press fitting is provided that includes a body comprising a body inner diameter. A first end includes a first end inner diameter and an inner surface. A sealing recess is positioned between the first end and the body. The inner surface includes a plurality of grooves. The plurality of grooves is integrally formed with the first end and comprises a blunt surface configured for a press fit between a pipe and the piping component. The plurality of grooves comprises a groove inner diameter that is within about ±10% of the body inner diameter and the first end inner diameter. The plurality of grooves includes an angled edge.

12 Claims, 5 Drawing Sheets

(56) References Cited

U.S. PATENT DOCUMENTS

| | | |
|---|---|---|
| 8,925,978 B2 | 1/2015 | Jamison et al. |
| 9,145,992 B2 | 9/2015 | Arment et al. |
| 9,638,361 B2 | 5/2017 | Arment et al. |
| 2011/0204624 A1* | 8/2011 | Lawrence ............. F16L 13/142 285/345 |
| 2013/0167357 A1* | 7/2013 | Arment ................ F16L 13/142 |
| 2014/0197633 A1* | 7/2014 | Nixon .................. F16L 13/142 285/382 |
| 2017/0328498 A1 | 11/2017 | Salehi-Bakhtiari |

* cited by examiner

PIPING COMPONENT HAVING A PLURALITY OF GROOVES

CROSS-REFERENCE TO RELATED APPLICATIONS

This patent application claims priority under 35 U.S.C. § 119(e) to U.S. Provisional Patent Application No. 62/823,772, entitled "PIPING COMPONENT HAVING A PLURALITY OF GROOVES," filed Mar. 26, 2019, the entire disclosure of which is incorporated herein by reference.

FIELD

The present disclosure generally relates to a piping component with a plurality of grooves, and more particularly, a piping component with a plurality of grooves at least partially defined by integral ridges of the piping component.

BACKGROUND

Over the years, the plumbing industry has witnessed a remarkable increase in the use of mechanical joinery systems as alternatives to traditional threaded connections (e.g., as-manufactured fittings with threaded ends joined by threading) and thermal connections (e.g., connections made by brazing, soldering, and/or welding). Further, within the general family of mechanical joinery, 'press' joint connections, as understood by those in the field of this disclosure, are finding use in or are being considered for application.

'Press' mechanical joinery includes interlocking devices such as sleeves that aid in affixing mating tubular members. The purpose of these interlocking devices is to mechanically grip the inserted tube, increasing joint slip resistance. However, when 'press' mechanical joinery is employed in actual use, uneven stress associated with the application of the press and/or hoop stress associated with service may cause the joinery to fail, even when a conventional sleeve is holding the tube of the joinery in place.

Accordingly, there is a need for interlocking devices configured for mechanical joinery, including connection sockets of tubular connections (e.g., piping connections) and piping components (e.g., valve assemblies), to include features that provide additional gripping of a pipe within the connection socket. In particular, features that grip the pipe while also accounting for expansion of the pipe when the pipe is exposed to high pressures may be desired.

SUMMARY OF THE DISCLOSURE

According to an aspect of the present disclosure, a piping component for a press fitting may be provided that may include a body including a body inner diameter. A first end may include a first end inner diameter and an inner surface. A sealing recess may be positioned between the first end and the body. The inner surface may include a plurality of grooves. The plurality of grooves may be integrally formed with the first end and may include a blunt surface configured for a press fit between a pipe and the piping component. The plurality of grooves may include a groove inner diameter that is substantially the same as or within no more than about ±5% of the body inner diameter and the first end inner diameter.

According to another aspect of the present disclosure, a piping component for a press fitting may be provided that may include a body including a body inner diameter. A first end may include a first end inner diameter and an inner surface. A sealing recess may be positioned between the first end and the body. The inner surface may include a plurality of grooves. The plurality of grooves may be integrally formed with the first end and may include a blunt surface configured for a press fit between a pipe and the piping component. The plurality of grooves may include a groove inner diameter that is within about ±5% of the body inner diameter and the first end inner diameter. Each of the plurality of grooves may include an angled edge. The angled edge may be positioned at an angle from about 30 degrees to less than 90 degrees from the blunt surface.

According to a further aspect of the present disclosure, a piping component for a press fitting may be provided that includes a body comprising a body inner diameter. A first end may include a first end inner diameter and an inner surface. A sealing recess may be positioned between the first end and the body. The inner surface may include a plurality of grooves. The plurality of grooves may be integrally formed with the first end and may include a blunt surface configured for a press fit between a pipe and the piping component. The plurality of grooves may include a groove inner diameter that is within about ±10% of the body inner diameter and the first end inner diameter. Each of the plurality of grooves may include an angled edge.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
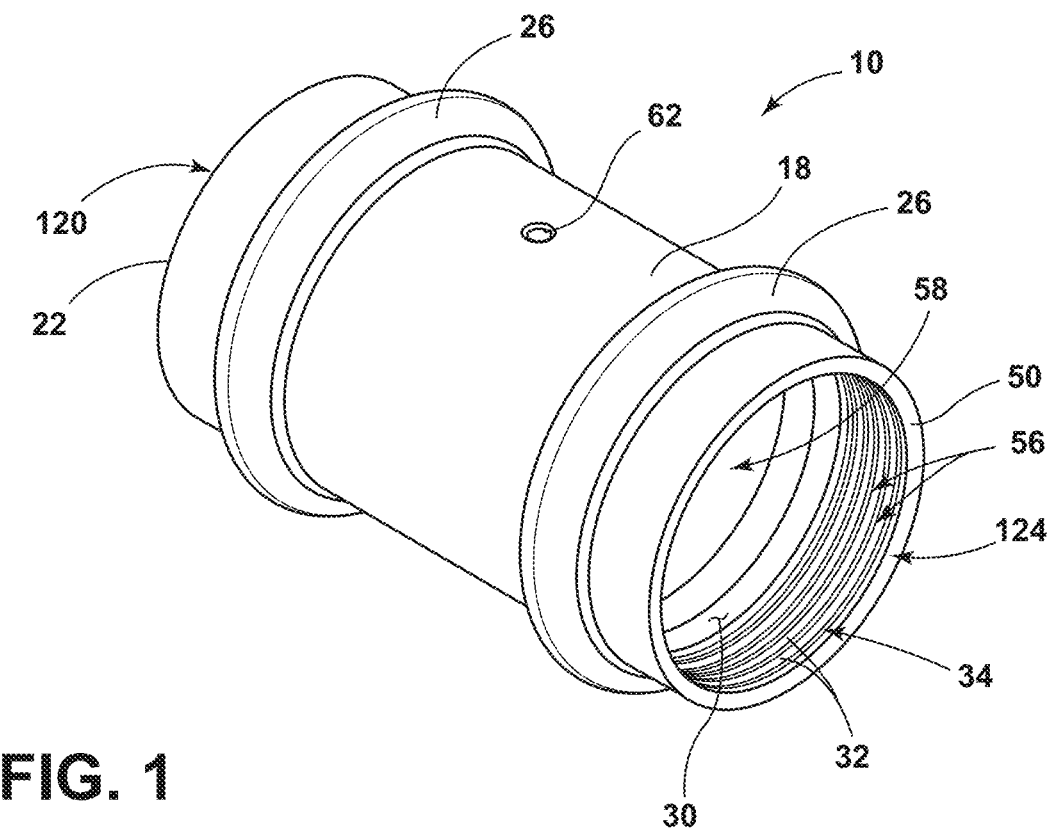
FIG. 1 is a side perspective view of a piping component, according to various examples.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The following disclosure generally describes a piping component for a press fitting that may include a plurality of grooves proximate an open end of the piping component. Each of the plurality of grooves may include grooves at least partially defined by one or more of a plurality of ridges. The plurality of grooves may further include at least one angled edge and a blunt surface of the plurality of ridges. The angled edge may be oriented to form an angle relative to the inner surface of the piping component. A pipe may be positioned within the open end of the piping component. An outer surface of the pipe may be positioned substantially parallel with the inner surface of the piping component. When the piping component is pressed, the blunt surfaces of the ridges are pressed into the outer surface of the pipe. The plurality of grooves are positioned proximate the outer surface of the pipe so that, when the pipe is used with a high-pressure medium, the pipe expands into the grooves of the plurality of grooves, creating a gripping effect of the piping component on the pipe.

In the disclosure, and depicted in exemplary form in FIGS. 1-6B, a piping component 10 for a press fitting 14 may include a body 18 including a body inner diameter D1. A first end 22 may include an end inner diameter D2 and an inner surface 30. A sealing recess 26 may be positioned between the first end 22 and the body 18. The inner surface 30 may include a plurality of grooves 34. The plurality of grooves 34 may be integrally formed with the first end 22 and may include a blunt surface 36 configured for a press fit between a pipe 100 and the piping component 10. The plurality of grooves 34 may include a groove inner diameter D3 that is substantially the same as or within no more than about ±5% of the body inner diameter D1 and the end inner diameter D2.

Figure 2:
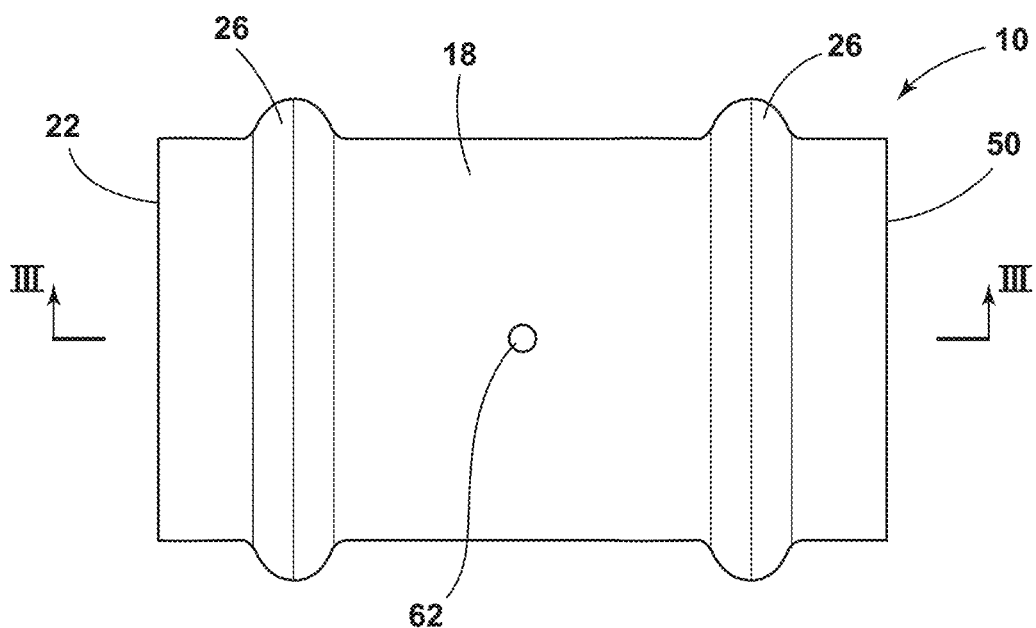
FIG. 2 is a side profile view of the piping component of FIG. 1.
Figure 3:
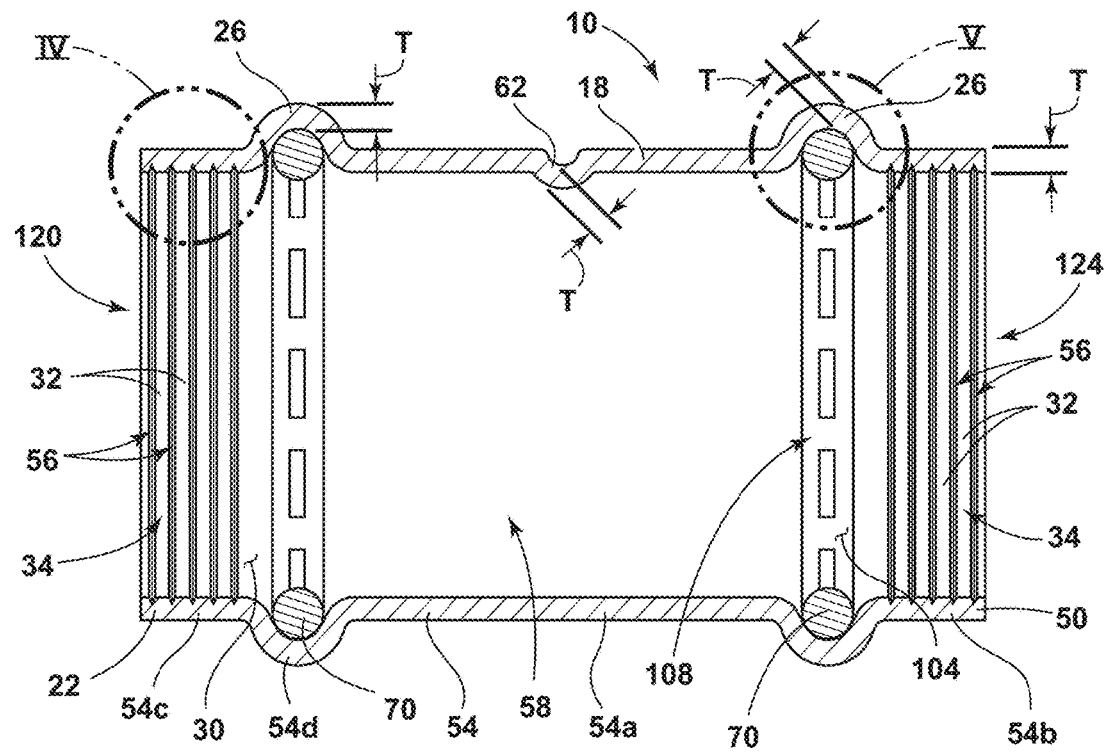
FIG. 3 is a cross-sectional view at line III-III of the piping component of FIG. 2.

Referring to FIGS. 1-3, the piping component 10 is shown according to various examples. The piping component 10 includes the body 18 integrally formed with the first open end 22 and a second open end 50. The piping component 10 may further include a wall 54. The wall 54 may extend from the first end 22 to the second end 50 (e.g., open ends of the piping component 10), encompassing the body 18 and defining a body cavity 56 of the piping component 10. The wall 54 of the piping component 10 may include the inner surface 30 and may be shaped to form the sealing recess 26 of the piping component 10. In some examples, the wall 54 may include a body wall 54a, a first end wall 54b, a second end wall 54c, and a sealing recess wall 54d.

The wall 54 of the piping component 10 may further include a stop 62 positioned between the first end 22 and the second end 50 of the piping component 10. The stop 62 may extend into the body cavity 56 of the piping component 10. The stop 62 may be equally spaced from each of the first and second ends 22, 50 of the piping component 10. Alternatively, the stop 62 may be positioned at any point along the body 18. In various examples, the stop 62 may be generally hemispherical. In other examples, the stop 62 may extend circumferentially about the body 18 of the piping component 10 and may have a circular, triangular, square, or rectangular cross-section. Where the cross-section includes corners, the corners may be rounded. In still other examples, more than one stop 62 may be used (e.g., a pair of stops 62 extending from opposing sides of the body 18 of the piping component 10, or a plurality of stops 62 circumferentially spaced apart about the body 18).

Referring again to FIGS. 1-3, the piping component 10 may further include at least one sealing recess 26 positioned between the body 18 and one of the first end 22 and the second end 50 of the piping component 10. The sealing recess 26 may be defined by the wall 54, or the sealing recess wall 54d, of the piping component 10. In various examples, the piping component 10 may include a sealing recess 26 positioned proximate the first end 22 of the piping component 10 and a sealing recess 26 positioned proximate the second end 50 of the piping component 10. In other examples, the piping component 10 may include more than one sealing recess 26 positioned proximate the first end 22 of the piping component 10 and more than one sealing recess 26 positioned proximate the second end 50 of the piping component 10. Each sealing recess 26 may be configured to receive a sealing element 70.

As shown in FIG. 3, the wall 54 may include a substantially uniform thickness T from the first end 22 of the piping component 10 to the second end 50 of the piping component 10. The thickness T of the wall 54 may be consistent across the sealing recesses 26, as well as along the body 18 of the piping component 10. The thickness T may be about 0.03 inches to about 0.07 inches, about 0.04 inches to about 0.06 inches, or any value or range of values therebetween. For example, the thickness T may be about 0.04 inches. In other examples, the thickness T may be about 0.06 inches. The thickness T may also be consistent across the stop 62. Where the thickness T is consistent across the stop 62, the radius and/or sizing of the stop 62 may be at least partially determined by the thickness T.

Figure 4:
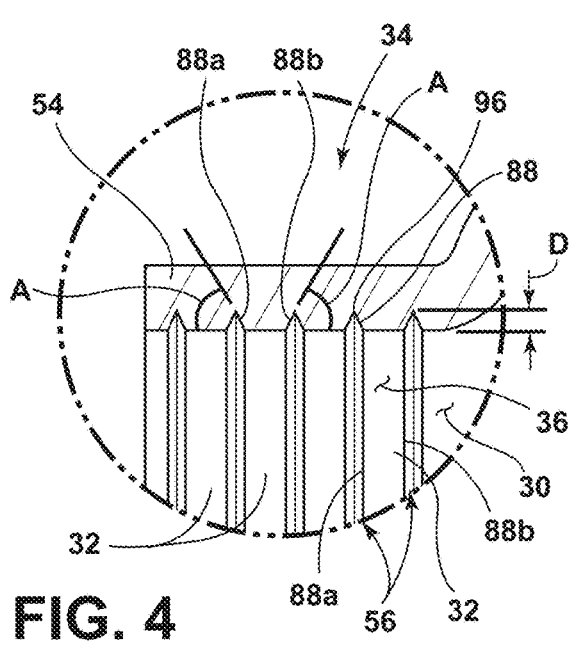
FIG. 4 is an expanded view of a plurality of grooves at least partially defined by a plurality of ridges of the piping component of FIG. 3.

Referring now to FIGS. 3 and 4, the inner surface 30 of the wall 54 of the piping component 10 may include the plurality of grooves 34. The plurality of grooves 34 may include grooves 56 extending circumferentially about by the inner surface 30 of the piping component 10 proximate one or both of the first and second ends 22, 50. The plurality of grooves 34 may be positioned between one of the sealing recesses 26 and one of the first end 22 and the second end 50. The grooves 56 of the plurality of grooves 34 may be evenly spaced apart between the sealing recess 26 and the first or second end 22, 50. In various examples, only five grooves 56 of the plurality of grooves 34 may be formed proximate each of the first and second ends 22, 50 (see FIG. 3). In other examples, the plurality of grooves 34 may include any number of grooves 56 positioned between the sealing recess 26 and the first or second end 22, 50.

As introduced above, the plurality of grooves 34 may include one or more ridges 32. Each ridge 32 may at least partially define one or more of the grooves 56 of the plurality of grooves 34. The grooves 56 may alternate with the ridges 32 across the inner surface 30 of piping component 10 between the respective sealing recess 26 and the first or second end 22, 50. Each of the ridges 32 may be substantially similar in size and may be evenly spaced from any other ridges 32 so that each groove 56 has substantially the same cross-sectional area. The number of ridges 32 may be the same or less than the number of grooves 56 (e.g., four ridges 32 at least partially define five grooves 56, as shown in FIGS. 3 and 4).

As shown in FIG. 4, each ridge 32 includes the blunt surface 36 oriented to be parallel and/or coplanar with the inner surface 30 of the wall 54 of the piping component 10. Each ridge 32 further includes at least one angled edge 88 extending downward from an edge of the blunt surface 36. In some examples, each ridge 32 may include first and second angled edges 88a, 88b. The first and second angled edges 88a, 88b may have opposite slopes to create a trapezoidal cross-section for the ridge 32. Each of the first and second angled edges 88a, 88b may be oriented to form an angle A relative to the inner surface 30. The angle A may be about 40 degrees to about 80 degrees, about 50 degrees to about 70 degrees, about 55 degrees to about 65 degrees, or any value or range of values therebetween. For example, the angle A may be about 60 degrees relative to the inner surface 30.

The angled edges 88a, 88b may be positioned to meet at a furthest recessed point 96 defining a centerline of the respective groove 56. A depth D of each groove 56 from the inner surface 30 to the point 96 may be about 0.005 inches to about 0.020 inches, about 0.007 inches to about 0.010 inches, or any value or range of values therebetween. For example, the depth D may be about 0.005 inches, about 0.006 inches, about 0.007 inches, about 0.008 inches, about 0.009 inches, about 0.010 inches, about 0.011 inches, about 0.012 inches, or any value or range of values between these depth values.

Figure 5:
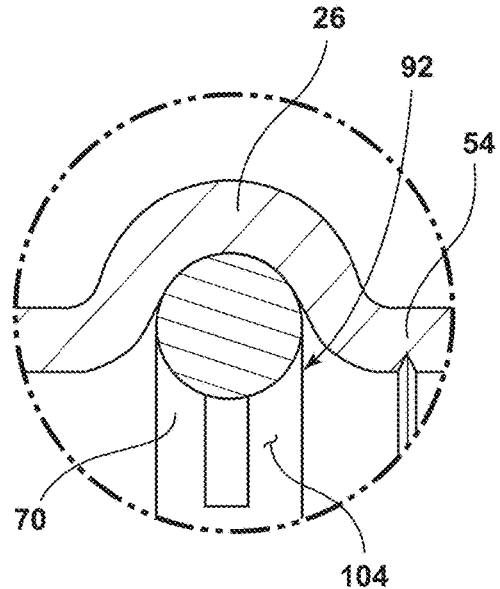
FIG. 5 is an expanded view of a sealing recess of the piping component of FIG. 3.

Referring now to FIGS. 3 and 5, as discussed previously, each sealing recess 26 may be configured to receive a sealing element 70. The sealing recess 26 may extend circumferentially about the piping component 10 and may separate the body 18 of the piping component 10 from the first and second open ends 22, 50. The sealing recess 26 may define a space 92 configured to receive the sealing element 70. The sealing element 70 may be any sealing element 70 configured to form an interference fit with a pipe 100 (see FIG. 6). Each sealing element 70 may further include an inner surface 104 defining a plurality of notches 108. The plurality of notches 108 may be configured to be used for a leak test, as discussed elsewhere herein. In some examples, the inner surface 104 may be a smooth surface without notches.

Figure 6:
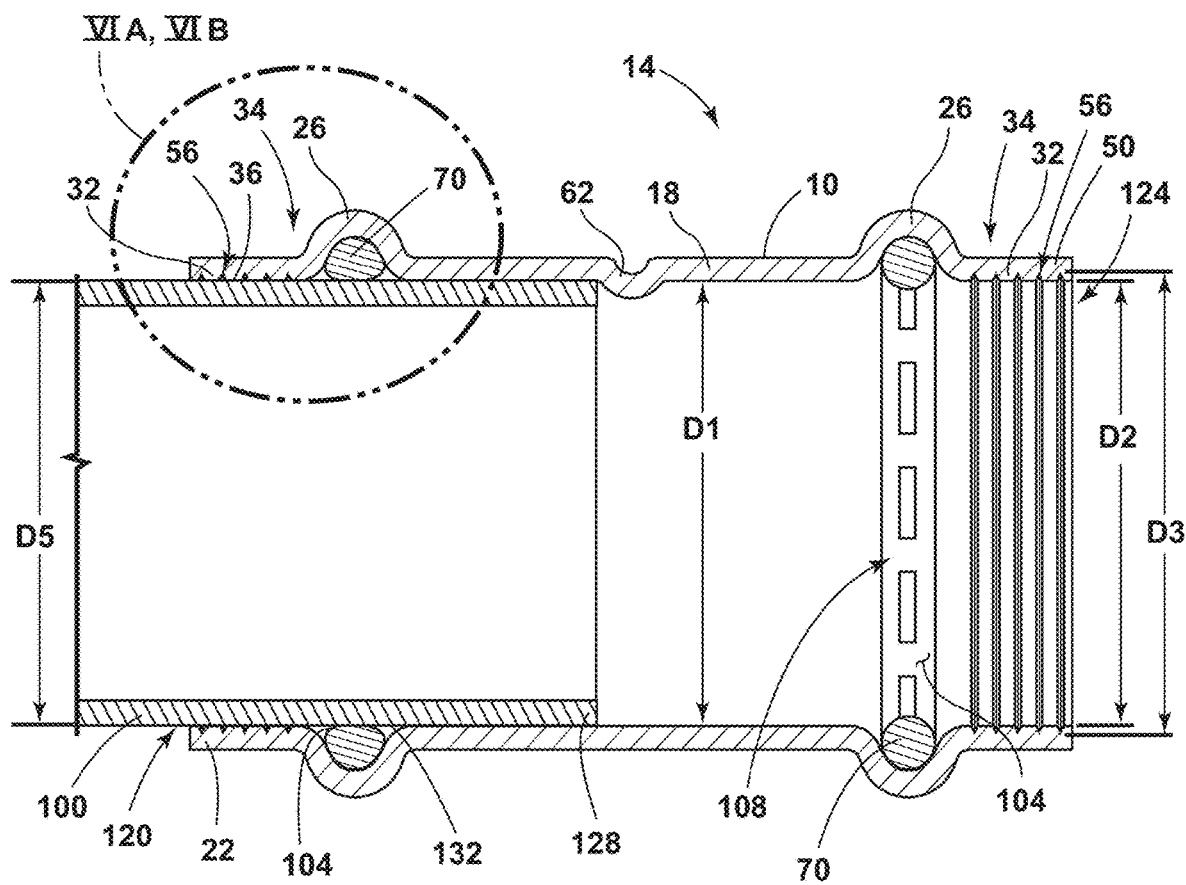
FIG. 6 is a cross-sectional view of a press fitting assembly including the piping component of FIG. 3.

Referring now to FIG. 6, the piping component 10 may include the body 18 having the body inner diameter D1. A first opening 120 may be defined by the first open end 22, and a second opening 124 may be defined by the second open end 50. Each of the first and second openings 120, 124 may have an end inner diameter D2. In various examples, the body inner diameter D1 may be the same as the end inner diameter D2. In other examples, the body inner diameter D1 may be larger than the end inner diameter D2. In still other examples, the body inner diameter D1 may be smaller than the end inner diameter D2. The end inner diameter D2 may be the same for both the first end 22 and the second end 50. Alternatively, the end inner diameter D2 of the first and second ends 22, 50 may vary.

The grooves 56 of the plurality of grooves 34 may be in communication with the opening 120, 124 of the first or second end 22, 50. The depth D of the grooves 56 may provide a groove inner diameter D3 of the piping component 10. The groove inner diameter D3 may be within plus or minus a percentage of the body inner diameter D1 and/or the end inner diameter D2. The percentage may be about 0% or within a range of about 1% to about 6%, about 2% to about 5%, about 3% to about 4%, or any value or range of values therebetween. For example, the groove inner diameter D3 may be within about 5% of the body inner diameter D1 and/or the end inner diameter D2. In another example, the groove inner diameter D3 may be substantially the same as or no more than about 4% greater than the body inner diameter D1 and/or the end inner diameter D2. In still other examples, the groove inner diameter D3 may be no more than 1% greater than the body inner diameter D1 and/or the end inner diameter D2.

Still referring to FIG. 6, the openings 120, 124 of the piping component 10 may be sized to receive the pipe 100 within the respective first or second open end 22, 50. The pipe 100 may be positioned within the piping component 10, such that a first end 128 of the pipe 100 abuts the stop 62. The inner surface 104 of the sealing element 70 may form an interference fit with an outer surface 132 of the pipe 100. The blunt surface 36 of each ridge 32 of the plurality of grooves 34 may also be configured to form an interference fit with the outer surface 132 of the pipe 100. To form these interference fits, the pipe 100 may have a pipe outer diameter D5 that is less than the end inner diameter D2 of the piping component 10. This difference in size between the pipe outer diameter D5 and the end inner diameter D2 allows the pipe 100 to be received by the respective first and second ends 22, 50.

Figure 6A:
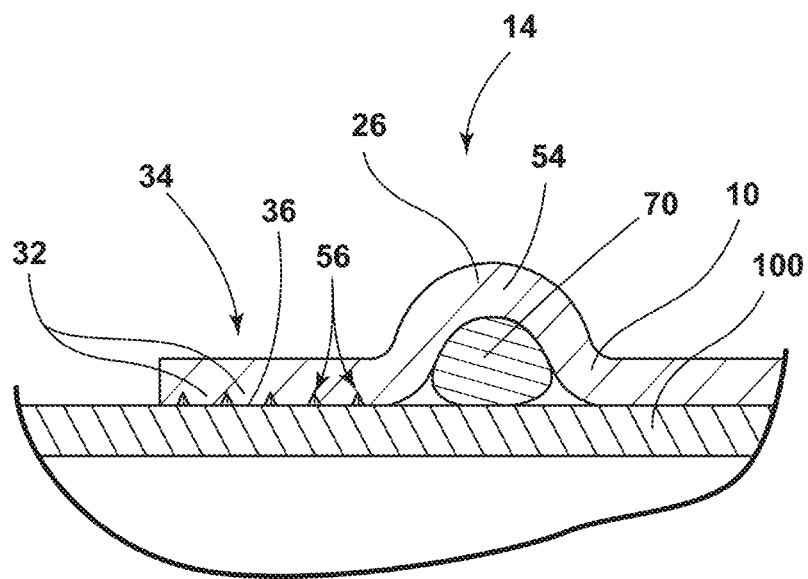
FIG. 6A is an expanded view of a plurality of grooves of the piping component of FIG. 6 with a pipe in a first state, according to various examples.
Figure 6B:
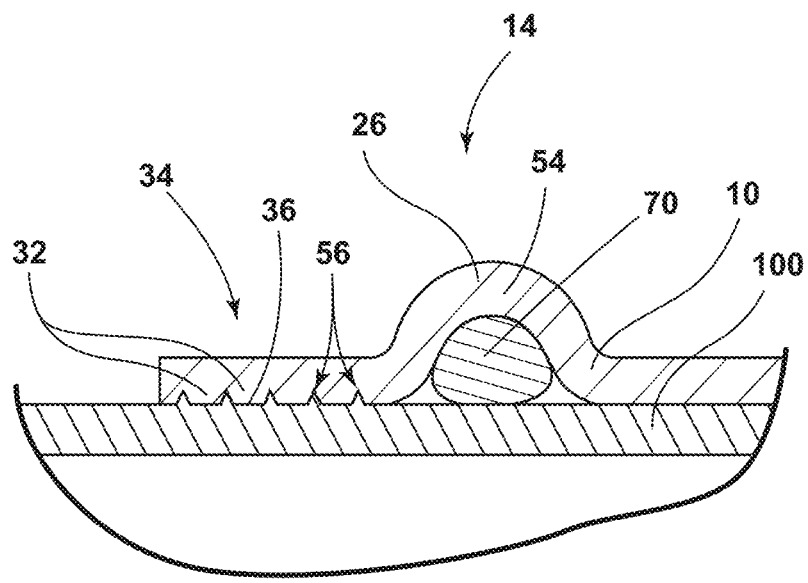
FIG. 6B is an expanded view of a plurality of grooves of the piping component of FIG. 6 with a pipe in a second state, according to various examples.

Referring now to FIGS. 6-6B, the piping component 10 and the pipe 100 may be formed of a copper alloy. In other examples, the piping component 10 may be formed of a first copper alloy, and the pipe 100 may be formed of a second copper alloy. In still other examples, the piping component 10 may be formed of an alloy material, and the pipe 100 may be formed of a copper alloy. Copper alloys, like those used to form the pipe 100, will expand when exposed to high pressure, pushing the outer surface 132 of the pipe 100 against the plurality of grooves 34 (see FIG. 6B). The positioning of the plurality of grooves 34 such that the grooves 56 and the ridges 32 are proximate the outer surface 132 of the pipe 100 provides expansion space for the pipe 100 when high pressure is applied. It will be understood that the expansion of the material may occur in any combination of a piping component 10 and a pipe 100 where the piping component 10 is formed of a material having a higher hardness, or resistance to deformation, than another material that the pipe 100 is formed of.

The plurality of grooves 34 are positioned proximate the outer surface 132 of the pipe 100 so that, when the piping component 10 is pressed during press joining of the piping component 10 and the pipe 100, the blunt surfaces 36 of the ridges 32 of the plurality of grooves 34 abut the outer surface 132 of the pipe 100 (see FIG. 6A). When the pipe 100 is used with a high-pressure medium, the pipe 100 expands into the groove 56 of the plurality of grooves 34 (see FIG. 6B), creating an additional grip and interference fit between the piping component 10 and the pipe 100. This additional interference fit provides a secure coupling of the piping component 10 with the pipe 100 that is stronger than the coupling formed when no grooves are present. The grooves 56 of the plurality of grooves 34 provide a space for receiving the expansion of the pipe 100, preventing the expansion from negatively affecting the grip of the piping component 10 on the pipe 100. Similarly, the blunt surfaces 36 of the ridges 32 of the plurality of grooves 34 provide a grip on the outer surface 132 of the pipe 100.

According to embodiments the grooves 56 of the plurality of grooves 34 can be selected with a depth D, such that resistance to pressure across the pipe 100 may be improved when the pipe 100 is exposed to the high-pressure medium. In some examples, the depth D of the grooves 56 may be configured to withstand a burst pressure of at least about 1,700 pounds per square inch (PSI). In some examples, the grooves 56 may be configured to withstand a burst pressure of at least about 1,700 PSI, at least about 1,800 PSI, at least about 1,900 PSI, at least about 2,000 PSI, at least about 2,100 PSI, at least about 2,200 PSI, at least about 2,300 PSI, at least about 2,400 PSI, or any value or range of values within these ranges. As an example, the joint between the piping component 10 and the pipe 100 may withstand about 1,750 PSI to about 1,950 PSI without the pressed joint bursting. As another example, the grip between the piping component 10 and the pipe 100 may withstand about 2,400 PSI to about 2,500 PSI. As yet another example, the grip between the piping component 10 and the pipe 100 may withstand about 2,200 PSI to about 2,500 PSI. When the pressure at the pressed joint reaches above about 2,400 PSI to about 2,500 PSI, the pipe 100 may experience failure not attributable to the grip of the piping component 10 on the pipe 100.

Referring now to FIGS. 1-6B, in various examples, prior to formation of a press fit between the piping component 10 and the pipe 100, a leak test may be performed using the sealing element 70. The plurality of notches 108 of the sealing element 70 may be configured to cause a leak upon leak testing of the piping component 10 when the piping component 10 is engaged with the pipe 100. In other words, the inner surface 104 of the sealing element 70 includes the plurality of notches 108 configured to cause a leak upon leak testing of the piping component 10 upon insertion of the pipe 100 and prior to a formation of a press fit between the piping component 10 and the pipe 100. When the piping component 10 is press fit with the pipe 100, the sealing element 70 may be compressed to eliminate the plurality of notches 108 and form an interference fit with the outer surface 132 of the pipe 100, as discussed previously.

Still referring to FIGS. 1-6B, in other examples, the plurality of notches 108 may be defined by one or more protrusions extending from the inner surface 104 of the sealing element 70. The sealing element 70 may be configured to rotate within the sealing recess 26. The rotation may encompass about 10 degrees to about 90 degrees, about 20 degrees to about 80 degrees, about 30 degrees to about 70 degrees, about 40 degrees to about 60 degrees, or any value or range of values therebetween. For example, where the protrusions extend inward of and substantially perpendicular to the wall 54 of the piping component 10, the sealing element 70 may rotate about 90 degrees. The rotation of the sealing element 70 may occur when the protrusions are contacted by the end 128 of the pipe 100 upon insertion of the pipe 100 within the piping component 10. The sealing element 70 is configured to rotate as the pipe 100 is inserted within the piping component 10 until the protrusions are free of contact with the pipe 100 or abut the inner surface 30 of the wall 54.

EXAMPLES

The following are non-limiting examples of a piping component including an integral plurality of grooves.

Comparative Example

In this example, three comparative piping components were provided. The piping components were generally formed as described above, but were designed without a plurality of grooves. Each piping component included a smooth, continuous inner surface without grooves, teeth, protrusions, or any other discontinuity. The piping component was tested according to UL Standard 207—Standard for Refrigerant-Containing Components and Accessories, Non-electrical to determine the maximum burst pressure that the piping component could withstand without failure. The test results are shown below in Table 1.

TABLE 1

| Comparative Example | Burst Pressure (PSI) |
| --- | --- |
| 1-1 | 1,697 |
| 1-2 | 1,644 |
| 1-3 | 1,598 |

Figure 7:
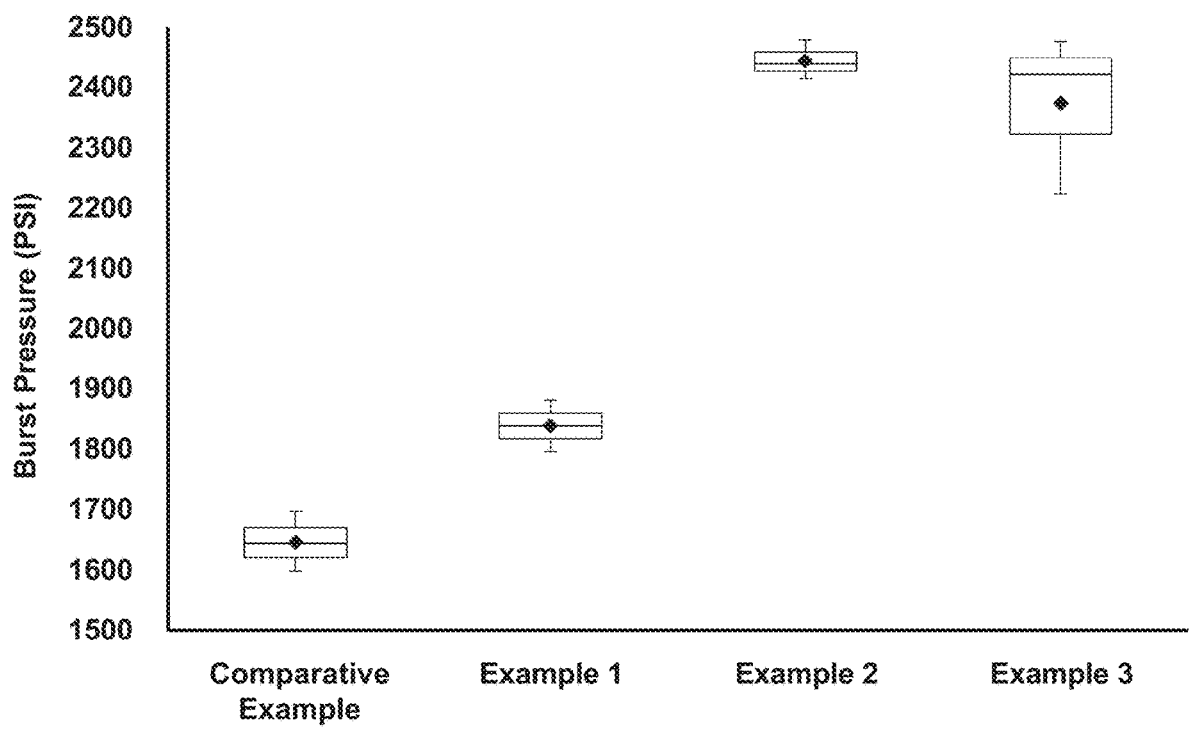
FIG. 7 is a schematic representation illustrating burst pressure as a function of groove depth according to Comparative Example and Examples 1-3.

As shown in Table 1, where the piping component lacked the plurality of grooves, the burst pressures the piping component was able to withstand were about 1,598 PSI to about 1,697 PSI. A box plot of the interquartile range, average, and the relative minimum and maximum values is shown in FIG. 7. On average, the comparative piping components were able to withstand about 1,646 PSI before failure.

Example 1

In this example, two piping components that are exemplary of the properties of the disclosure were provided. The piping components were generally formed as described above and were designed with a plurality of grooves including grooves having an average depth of about 0.006 inches measured from an inner surface of the respective piping component to a furthest recessed portion of each groove (e.g., depth D). Each piping component was tested according to UL Standard 207—Standard for Refrigerant-Containing Components and Accessories, Nonelectrical to determine the maximum burst pressure that each piping component could withstand without failure. The test results are shown below in Table 2.

TABLE 2

| Example | Burst Pressure (PSI) |
|---------|----------------------|
| 1-1     | 1,796                |
| 1-2     | 1,881                |

As shown in Table 2, where the exemplary piping component included grooves having an average depth of about 0.006 inches, the burst pressures the piping component was able to withstand were about 1,796 PSI to about 1,881 PSI. A box plot of the interquartile range, average, and the relative minimum and maximum values is shown in FIG. 7. On average, the piping components of this example were able to withstand about 1,838 PSI before failure. As shown in FIG. 7, these values indicate that implementing the grooves (e.g., the grooves 56 of the plurality of grooves 32) may provide an increase in the average burst pressure that can be applied to the piping component in service before the piping component fails as compared to a piping component with no grooves (see Comparative Example).

Example 2

In this example, three piping components that are exemplary of the properties of the disclosure were provided. The piping components were generally formed as described above and were designed with a plurality of grooves including grooves having an average depth of about 0.009 inches measured from an inner surface of the respective piping component to a furthest recessed portion of each groove (e.g., depth D). Each piping component was tested according to UL Standard 207—Standard for Refrigerant-Containing Components and Accessories, Nonelectrical to determine the maximum burst pressure that each piping component could withstand without failure. The test results are shown below in Table 3.

TABLE 3

| Example | Burst Pressure (PSI) |
|---------|----------------------|
| 2-1     | 2,439                |
| 2-2     | 2,414                |
| 2-3     | 2,479                |

As shown in Table 3, where the exemplary piping component included grooves having an average depth of about 0.009 inches, the burst pressures the piping component was able to withstand were about 2,414 PSI to about 2,479 PSI. A box plot of the interquartile range, average, and the relative minimum and maximum values is shown in FIG. 7. On average, the piping components of this example were able to withstand about 2,444 PSI before failure. As shown in FIG. 7, these values indicate that grooves (e.g., the grooves 56 of the plurality of grooves 32) having an average depth of about 0.009 may provide a larger increase in the average burst pressure that can be applied to the piping component in service before the piping component fails as compared to the burst pressures experienced by the piping components of Example 1 having an average depth of about 0.006 inches.

Example 3

In this example, three piping components that are exemplary of the properties of the disclosure were provided. The piping components were generally formed as described above and were designed with a plurality of grooves including grooves having an average depth of about 0.012 inches measured from an inner surface of the respective piping component to a furthest recessed portion of each groove (e.g., depth D). The piping component was tested according to UL Standard 207—Standard for Refrigerant-Containing Components and Accessories, Nonelectrical to determine the maximum burst pressure that each piping component could withstand without failure. The test results are shown below in Table 4.

TABLE 4

| Example | Burst Pressure (PSI) |
|---------|----------------------|
| 3-1     | 2,421                |
| 3-2     | 2,476                |
| 3-3     | 2,223                |

As shown in Table 4, where the exemplary piping component included grooves having an average depth of about 0.012 inches, the burst pressures the piping component was able to withstand were about 2,223 PSI to about 2,476 PSI. A box plot of the interquartile range, average, and the relative minimum and maximum values is shown in FIG. 7. On average, the piping components of this example were able to withstand about 2,373 PSI before failure. As shown in FIG. 7, these values indicate that grooves having an average depth of about 0.012 may provide a larger increase in the average burst pressure that can be applied to the piping component in service before the piping component fails as compared to the burst pressures experienced by the piping components of Example 1 having an average depth of about 0.006 inches. However, these values also indicate piping components including grooves having an average depth of about 0.009 inches (see Example 2) may experience similar burst pressures to piping components including grooves having an average depth of about 0.012 inches.

According to a first aspect, a piping component for a press fitting may be provided that may include a body including a body inner diameter. A first end may include a first end inner diameter and an inner surface. A sealing recess may be positioned between the first end and the body. The inner surface may include a plurality of grooves. The plurality of grooves may be integrally formed with the first end and may include a blunt surface configured for a press fit between a pipe and the piping component. The plurality of grooves may include a groove inner diameter that is substantially the same as or within no more than about ±5% of the body inner diameter and the first end inner diameter.

According to a second aspect, the first aspect is provided, wherein the plurality of grooves may include a depth of from about 0.005 inches to about 0.020 inches.

According to a third aspect, the first aspect is provided, wherein the plurality of grooves may include a depth of from about 0.007 inches to about 0.010 inches.

According to a fourth aspect, any one of the first through third aspects is provided, wherein each of the body, the first end and the sealing recess may include a respective body wall, first end wall and sealing recess wall. The walls may have substantially the same thickness.

According to a fifth aspect, any one of the first through fourth aspects is provided, wherein the groove inner diameter may be substantially the same as or no more than about 4% greater than the body inner diameter and the first end inner diameter.

According to a sixth aspect, any one of the first through fifth aspects is provided, wherein the piping component may be formed of a copper alloy.

According to another aspect, the piping component of any one of the first through sixth aspects may further include a sealing element positioned within the sealing recess. The sealing element may include a sealing element inner surface. The sealing element inner surface may include a plurality of notches configured to cause a leak upon leak testing of the piping component upon insertion of a pipe and prior to a formation of a press fit between the piping component and the pipe.

According to a seventh aspect, any one of the first through sixth aspects is provided, wherein the plurality of grooves may be sized to withstand a pressure of at least 2,000 PSI in service.

According to an eighth aspect, a piping component for a press fitting may be provided that may include a body including a body inner diameter. A first end may include a first end inner diameter and an inner surface. A sealing recess may be positioned between the first end and the body. The inner surface may include a plurality of grooves. The plurality of grooves may be integrally formed with the first end and may include a blunt surface configured for a press fit between a pipe and the piping component. The plurality of grooves may include a groove inner diameter that is within about ±5% of the body inner diameter and the first end inner diameter. Each of the plurality of grooves may include an angled edge. The angled edge may be positioned at an angle from about 30 degrees to less than 90 degrees from the blunt surface.

According to a ninth aspect, the eighth aspect is provided, wherein the plurality of grooves may include a depth of from about 0.005 inches to about 0.020 inches.

According to a tenth aspect, the eighth aspect is provided, wherein the plurality of grooves may include a depth of from about 0.007 inches to about 0.010 inches.

According to an eleventh aspect, any one of the eighth through tenth aspects is provided, wherein each of the body, the first end and the sealing recess may include a respective body wall, first end wall and sealing recess wall. The walls may have substantially the same thickness.

According to a twelfth aspect, any one of the eighth through eleventh aspects is provided, wherein the groove inner diameter may be substantially the same as or no more than about 4% greater than the body inner diameter and the first end inner diameter.

According to another aspect, the piping component of any one of the eighth through twelfth aspects may further include a sealing element positioned within the sealing recess. The sealing element may include a sealing element inner surface. The sealing element inner surface may include a plurality of notches configured to cause a leak upon leak testing of the piping component upon insertion of a pipe and prior to a formation of a press fit between the piping component and the pipe.

According to thirteenth aspect, any one of the eighth through twelfth aspects is provided, wherein the plurality of grooves may be sized to withstand a pressure of at least 2,000 PSI in service.

According to a fourteenth aspect, any one of the eighth through thirteenth aspects is provided, wherein the angled edge may be positioned at an angle from about 45 degrees to about 75 degrees from the blunt surface.

According to a fifteenth aspect, a piping component for a press fitting may be provided that includes a body comprising a body inner diameter. A first end may include a first end inner diameter and an inner surface. A sealing recess may be positioned between the first end and the body. The inner surface may include a plurality of grooves. The plurality of grooves may be integrally formed with the first end and may include a blunt surface configured for a press fit between a pipe and the piping component. The plurality of grooves may include a groove inner diameter that is within about ±10% of the body inner diameter and the first end inner diameter. Each of the plurality of grooves may include an angled edge.

According to a sixteenth aspect, the fifteenth aspect is provided, wherein the plurality of grooves may include a depth of from about 0.005 inches to about 0.020 inches.

According to a seventeenth aspect, the fifteenth aspect is provided, wherein the plurality of grooves may include a depth of from about 0.007 inches to about 0.010 inches.

According to an eighteenth aspect, any one of the fifteenth through seventeenth aspects is provided, wherein each of the body, the first end and the sealing recess may include a respective body wall, first end wall and sealing recess wall. The walls may have substantially the same thickness.

According to a nineteenth aspect, any one of the fifteenth through eighteenth aspects is provided, wherein the groove inner diameter may be substantially the same as or no more than about 4% greater than the body inner diameter and the first end inner diameter.

According to another aspect, any one of the fifteenth through nineteenth aspects is provided, wherein the piping component may further include a sealing element positioned within the sealing recess. The sealing element may include a sealing element inner surface. The sealing element inner surface may include a plurality of notches configured to cause a leak upon leak testing of the piping component upon insertion of a pipe and prior to a formation of a press fit between the piping component and the pipe.

According to a twentieth aspect, the fifteenth aspect is provided, wherein the plurality of grooves may be sized to withstand a pressure of at least 2,000 PSI in service.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A piping component for a press fitting, comprising:
a body having a body inner diameter;
a sealing recess; and
a first end positioned such that the sealing recess is positioned axially between the body and the first end, the first end having an inner surface that comprises:
an end portion that extends axially toward the sealing recess from an axial end of the piping component, wherein the end portion defines a first opening at the axial end of the piping component, and the first opening has a first end inner diameter;
a first groove positioned axially between the sealing recess and the end portion;
a second groove positioned axially between the sealing recess and the first groove, wherein each of the first and second grooves has a groove inner diameter that is greater than the first end inner diameter, and wherein each of the first and second grooves respectively includes a pair of angled edges that meet at a furthest recessed point of each of the first and second grooves, respectively, such that the first and second grooves each have a v-shaped cross-section; and
a blunt portion that extends axially between the first and second grooves, wherein the blunt portion of the inner surface is parallel with the end portion of the inner surface, a diameter of the blunt portion is the same as the first end inner diameter, and the blunt portion and the end portion are co-cylindrical.

2. The piping component of claim 1, wherein the groove inner diameter is larger than the first end inner diameter by no more than about 5%.

3. The piping component of claim 2, wherein each of the first and second grooves has a depth in a range of about 0.005 inches to about 0.020 inches.

4. The piping component of claim 2, wherein each of the first and second grooves has a depth in a range of about 0.007 inches to about 0.10 inches.

5. The piping component of claim 1, wherein the groove inner diameter is larger than the body inner diameter and the first end inner diameter by no more than about 4%.

6. The piping component of claim 1, wherein the piping component is formed of a copper alloy.

7. The piping component of claim 1, wherein the diameter of the blunt portion is the same as the body inner diameter.

8. A piping component for a press fitting, comprising:
a body having a body inner diameter;
a sealing recess adjacent to the body; and
a first end adjacent to the sealing recess axially opposite the body and extending axially therefrom to an axial end of the piping component, the first end having an inner surface that comprises:
an end portion that extends axially toward the sealing recess from the axial end of the piping component, wherein the end portion defines a first opening at the axial end of the piping component, and the first opening has a first end inner diameter;
a plurality of grooves positioned axially between the sealing recess and the end portion, each having a v-shaped cross-section; and
a plurality of blunt portions configured for a press fit between a pipe and the piping component, each extending axially between adjacent grooves of the plurality of grooves, wherein each of the blunt portions of the inner surface is parallel with the end portion of the inner surface, a diameter of each of the blunt portions is the same as the first end inner diameter, and each of the blunt portions and the end portion are co-cylindrical.

9. The piping component of claim 8, wherein the diameter of the blunt portions is the same as the body inner diameter.

10. The piping component of claim 8, wherein each of the grooves has a groove inner diameter that is larger than the first end inner diameter by no more than about 5%.

11. The piping component of claim 10, wherein each of the grooves has a depth in a range of about 0.005 inches to about 0.020 inches.

12. The piping component of claim 11, wherein each of the grooves has a depth in a range of about 0.007 inches to about 0.010 inches.

* * * * *